(12) United States Patent
Kim et al.

(10) Patent No.: US 9,983,654 B2
(45) Date of Patent: May 29, 2018

(54) ELECTRONIC DEVICE AND METHOD OF CONTROLLING POWER OF ELECTRONIC DEVICE

(71) Applicant: Samsung Electronics Co., Ltd., Suwon-si (KR)

(72) Inventors: Min-Su Kim, Suwon-si (KR); Chi-Hyun Cho, Suwon-si (KR); Seung-Chul Choi, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 28 days.

(21) Appl. No.: 14/884,524

(22) Filed: Oct. 15, 2015

(65) Prior Publication Data

US 2016/0124495 A1 May 5, 2016

(30) Foreign Application Priority Data

Oct. 31, 2014 (KR) ........................ 10-2014-0150479

(51) Int. Cl.
*G06F 1/32* (2006.01)
*H04W 52/02* (2009.01)

(52) U.S. Cl.
CPC .......... *G06F 1/3228* (2013.01); *G06F 1/3218* (2013.01); *H04W 52/0264* (2013.01); *Y02D 70/00* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ....... G06F 1/28; G06F 1/3218; G01R 21/133; H04W 52/0264
See application file for complete search history.

(56) References Cited

U.S. PATENT DOCUMENTS

| 2009/0013204 A1 | 1/2009 | Kobayashi et al. |
| 2010/0145643 A1 | 6/2010 | Kobayashi et al. |
| (Continued) | | |

FOREIGN PATENT DOCUMENTS

| JP | 2014-096634 | 5/2014 |
| KR | 10 20110129335 | 12/2011 |

OTHER PUBLICATIONS

International Search Report dated Mar. 31, 2016 corresponding to International Application No. PCT/KR2015/011502.
(Continued)

*Primary Examiner* — Albert Wang
(74) *Attorney, Agent, or Firm* — McAndrews, Held & Malloy, Ltd.

(57) ABSTRACT

An electronic device is disclosed. The electronic device may include a data provider that stores at least one piece of data for calculating a current consumption value according to each application type; and a processor that changes a data collection period according to a power state of the electronic device, collect data from the data provider, calculates the current consumption value according to each application type based on the power state of the electronic device based on the collected data, and displays the calculated current consumption value according to each application type on a display.

18 Claims, 13 Drawing Sheets

| Power state | Processor | LCD | Data collection period | |
|---|---|---|---|---|
| Power state | ON | ON | Short | First data collection period |
| Screen Bright Wake Lock | ON | ON | Short | |
| Screen DIM Wake Lock | ON | ON(DIM) | Normal | |
| Partial Wake Lock | ON | OFF | Long | Second collection period |
| Sleep | OFF | OFF | interrupt mode | |

(56) References Cited

U.S. PATENT DOCUMENTS

| | | | |
|---|---|---|---|
| 2011/0040996 A1* | 2/2011 | Hackborn | G06F 11/3409 |
| | | | 713/340 |
| 2011/0109613 A1 | 5/2011 | Asai | |
| 2011/0296416 A1 | 12/2011 | Kim | |
| 2012/0134517 A1 | 5/2012 | Sato | |
| 2012/0155911 A1 | 6/2012 | Hirota | |
| 2014/0143568 A1 | 5/2014 | Kim et al. | |
| 2014/0181471 A1* | 6/2014 | Juang | G06F 1/3206 |
| | | | 712/30 |
| 2016/0048682 A1* | 2/2016 | Gou | H04W 4/00 |
| | | | 726/22 |

OTHER PUBLICATIONS

Written Opinion of the International Searching Authority dated Mar. 31, 2016 corresponding to International Application No. PCT/KR2015/011502.

\* cited by examiner

| Power state | Processor | LCD | Data collection period | |
|---|---|---|---|---|
| Power state | ON | ON | Short | First data collection period |
| Screen Bright Wake Lock | ON | ON | Short | |
| Screen DIM Wake Lock | ON | ON(DIM) | Normal | Second collection period |
| Partial Wake Lock | ON | OFF | Long | |
| Sleep | OFF | OFF | interrupt mode | |

FIG.5A

| App Name (a1) | execution time (b1) | CPU occupancy rate (c1) | current consumption (d1) | number of wakeups (e1) | LCD state (f1) |
|---|---|---|---|---|---|
| App-1 | 150 sec. | 70 % | 500 mA |  | LCD ON |
| App-1 | 30 sec. | 55 % | 70 mA | 2 | LCD OFF |
| App-2 | 45 sec. | 20 % | 80 mA | 3 | LCD OFF |
| App-3 | 370 sec. | 85 % | 650 mA |  | LCD ON |
| ... |  |  | ... | ... | ... |
| App-2 | n sec. | n % | n mA |  | LCD ON |
| App-3 | m sec. | m % | m mA | n | LCD OFF |

FIG.5B

| App Name | execution time | current consumption | number of wakeups | LCD state |
|---|---|---|---|---|
| App-1 | 150 sec. | 350 mA |  | LCD ON |
| App-1 | 30 sec. | 38.5 mA | 2 | LCD OFF |
| App-2 | 45 sec. | 16 mA | 3 | LCD OFF |
| App-3 | 370 sec. | 552.5 mA |  | LCD ON |
| ... |  | ... | ... | ... |
| App-2 | n sec. | n*n mA | n | LCD ON |
| App-3 | m sec. | m*m mA | m | LCD OFF |

ELECTRONIC DEVICE AND METHOD OF CONTROLLING POWER OF ELECTRONIC DEVICE

RELATED APPLICATION(S)

This application claims priority under 35 U.S.C. § 119(a) to Korean Application Serial No. 10-2014-0150479, which was filed in the Korean Intellectual Property Office on Oct. 31, 2014, the entire content of which is hereby incorporated by reference.

BACKGROUND

The present disclosure relates to an electronic device and a method of controlling power of an electronic device.

In general, an application preloaded in an electronic device (e.g., a smart phone) is released to minimize errors during operations or exceptional situations through numerous verifications in a manufacturing process. However, most applications downloaded from a server (e.g., Google play, and Naver app) and installed do not meet a quality level required by manufacturers in many cases. Accordingly, even in a case of the electronic device released after being optimized in the manufacturing process, capability deterioration or a rapid reduction in a battery use time may be generated due to an installation of an application which has not been verified.

SUMMARY

Various embodiments may provide a method of detecting an application having large capability deterioration or large current consumption and a method of informing a user of the application to induce the user to limit an operation of the application or delete the application.

The electronic device may provide a menu for calculating a battery use ratio according to each process by using an internal algorithm and arranging and showing the calculated ratios in a descending order. However, since the menu shows a result calculated based on a reference value input during a manufacturing process, an accurate value is not acquired compared to actually measured data. Further, since a relative value between processes is displayed, it is not possible to identify how much current is actually consumed.

When the user does not control the electronic device (e.g., when a display off state is maintained for a predetermined time), if the electronic device cannot enter a sleep state due to a user's intended operation such as content download or a user's unintended operation such as malfunction of an application, a battery level (State Of Charge: SOC) of the electronic device may rapidly decrease.

In order to solve the above described problems or other problems, various embodiments may provide an electronic device and a method of controlling power of an electronic device, which calculate and provide the current consumption value according to each application type based on the power state of the electronic device.

In accordance with an aspect of the present disclosure, an electronic device is provided. The electronic device includes: a display; a data provider that stores at least one piece of data for calculating a current consumption value according to each application type; and a processor that changes a data collection period according to a power state of the electronic device, collects data from the data provider, and calculates and causes to the display to display the current consumption value according to each application type based on the power state of the electronic device based on the collected data.

In accordance with another aspect of the present disclosure, a method of controlling power of an electronic device is provided. The method includes: changing a data collection period according to a power state of the electronic device; collecting data according to the changed data collection period; and calculating and displaying the current consumption value according to each application type based on the power state of the electronic device based on the collected data.

An electronic device and a method of controlling power of an electronic device according to various embodiments can calculate and provide a current consumption value according to each application type based on a power state of the electronic device, thereby increasing a battery use time.

BRIEF DESCRIPTION OF THE DRAWINGS

The above and other aspects, features, and advantages of the present disclosure will be more apparent from the following detailed description taken in conjunction with the accompanying drawings, in which:

FIGS. 5A through 5C illustrate data collected by an electronic device according to various embodiments;

FIGS. 6A through 6C illustrate a list including a current consumption value according to each application type in an electronic device according to various embodiments;

DETAILED DESCRIPTION

Figure 1:
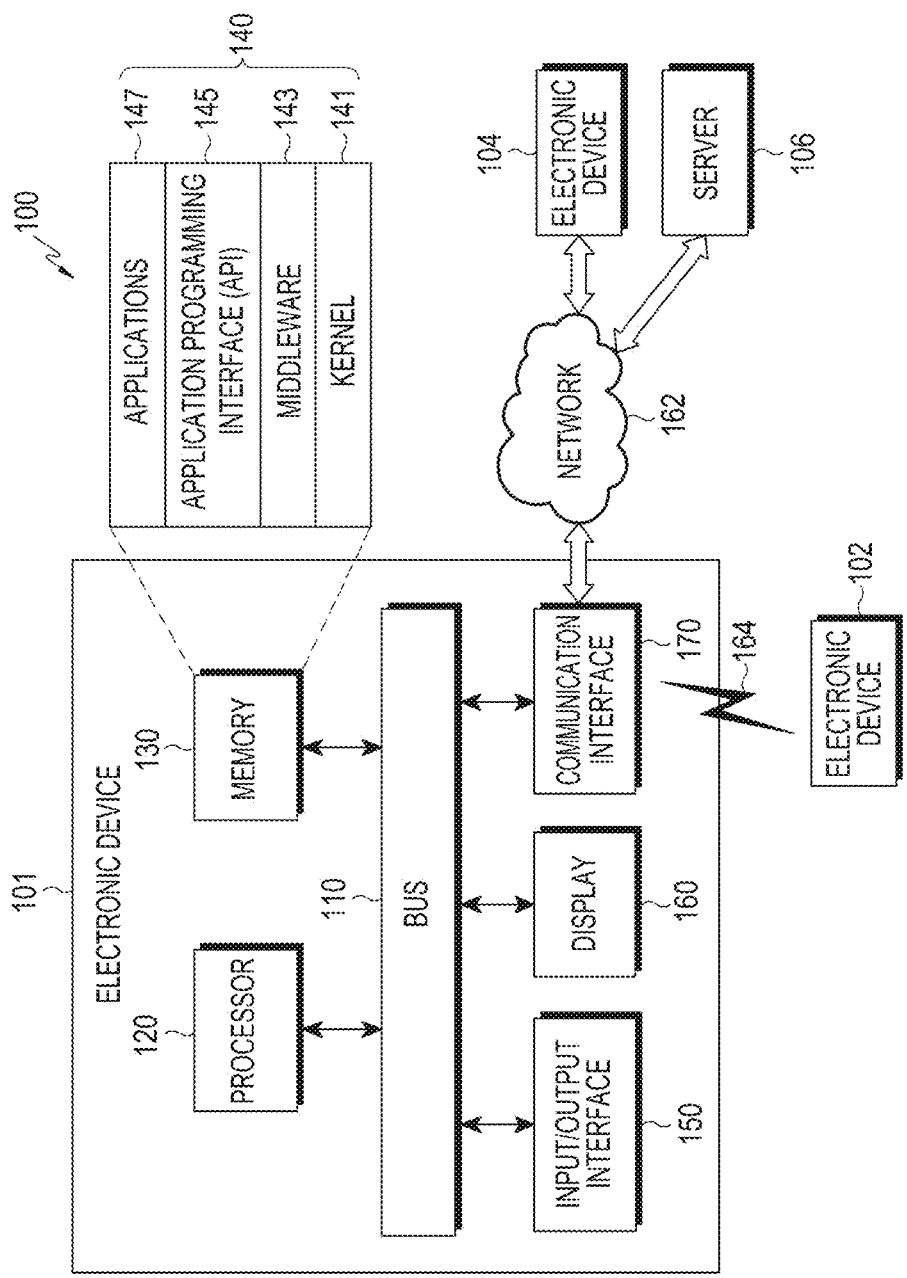
FIG. 1 illustrates a network environment system according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. In the present disclosure, the term "user" may indicate a person using an electronic device or a device (e.g. an artificial intelligence electronic device) using an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may deem at least some of the above components optional, or further include other components.

The bus 110 may include a circuit for connecting the components 110 to 170 and transmitting communication between the components (e.g., control message and/or data).

The processor 120 may include one or more of a Central Processing Unit (CPU), an Application Processor (AP), and a Communication Processor (CP). The processor 120 may control, for example, one or more other components of the electronic device 101 and/or process an operation or data related to communication.

The memory 130 may include a volatile memory and/or a non-volatile memory. The memory 130 may store, for example, commands or data related to at least one other component of the electronic device 101. According to an embodiment, the memory 130 may store software and/or a program 140. The program 140 may include, for example, a kernel 141, middleware 143, an Application Programming Interface (API) 145, and/or an application program (or "applications") 147. At least some of the kernel 141, the middle 143, and the API 145 may be referred to as an Operating System (OS).

The kernel 141 may control or manage system resources (e.g., the bus 110, the processor 120, or the memory 130) used for executing an operation or function implemented by other programs (e.g., the middleware 143, the API 145, or the application program 147). Furthermore, the kernel 141 may provide an interface through which the middleware 143, the API 145, or the application program 147 may access individual components of the electronic device 101 to control or manage system resources.

The middleware 143 may serve as an intermediary such that, for example, the API 145 or the application program 147 may communicate with the kernel 141 to transmit/receive data. Further, in relation to task requests received from the application program 147, the middleware 143 may control (e.g., scheduling or load-balancing) the task requests by using, for example, a method of assigning a sequence for using system resources (e.g., the bus 110, the processor 120, the memory 130, or the like) of the electronic device 101 to at least one application of the application program 147.

The API 145 is an interface by which the applications 147 control functions provided from the kernel 141 or the middleware 143, and may include, for example, at least one interface or function (e.g., command) for file control, window control, image processing, or text control.

The input/output interface 150 may serve as an interface which can transmit commands or data input from the user or another external device to other component(s) of the electronic device 101. Further, the input/output interface 150 may output commands or data received from another component(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (e.g., text, images, videos, icons, or symbols) for users. The display 160 may include a touch screen, and may receive, for example, a touch, gesture, proximity, or hovering input using an electronic pen or a user's body part.

The communication interface 170 may configure communication between, for example, the electronic device 101 and an external device (e.g., a first external electronic device 102, a second external electronic device 104, or a server 106). For example, the communication interface 170 may be connected to a network 162 through wireless or wired communication to communicate with the external device (e.g., the external electronic device 104 or the server 106).

The wireless communication may use, for example, at least one of Long-Term Evolution (LTE), Long-Term Evolution-Advanced (LTE-A), Code Division Multiple Access (CDMA), Wideband Code Division Multiple Access (WCDMA), Universal Mobile Telecommunications System (UMTS), Wireless Broadband (WiBro), and Global System for Mobile Communications (GSM), for example, as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). Although not shown, the network 162 may include at least one of communication networks such as a computer network (e.g., a local area network (LAN) or a wide area network (WAN)), the Internet, and a telephone network.

Each of the first and second external electronic devices 102 and 104 may be a device which is the same type as or different type from the electronic device 101. According to an embodiment, the server 106 may include a group of one or more servers. According to various embodiments, some or all of the operations executed by the electronic device 101 may be executed by another electronic device or a plurality of electronic devices (e.g., the electronic device 102 or 104, or the server 106). According to an embodiment, when the electronic device 101 should perform some functions or services automatically or on request, the electronic device 101 may make a request for performing at least some of the functions related to the functions or services to another device (e.g., the electronic devices 102 and 104 or the server 106) instead of performing the functions or services. Another electronic device (e.g., the electronic devices 102 and 104 or the server 106) may execute the requested functions or additional functions, and transmit a result thereof to the electronic device 101. The electronic device 101 may provide the requested functions or services based on the received result as it is or after additionally processing the received result. To achieve this, for example, cloud computing, distributed computing, or client-server computing technology may be used.

Figure 2:
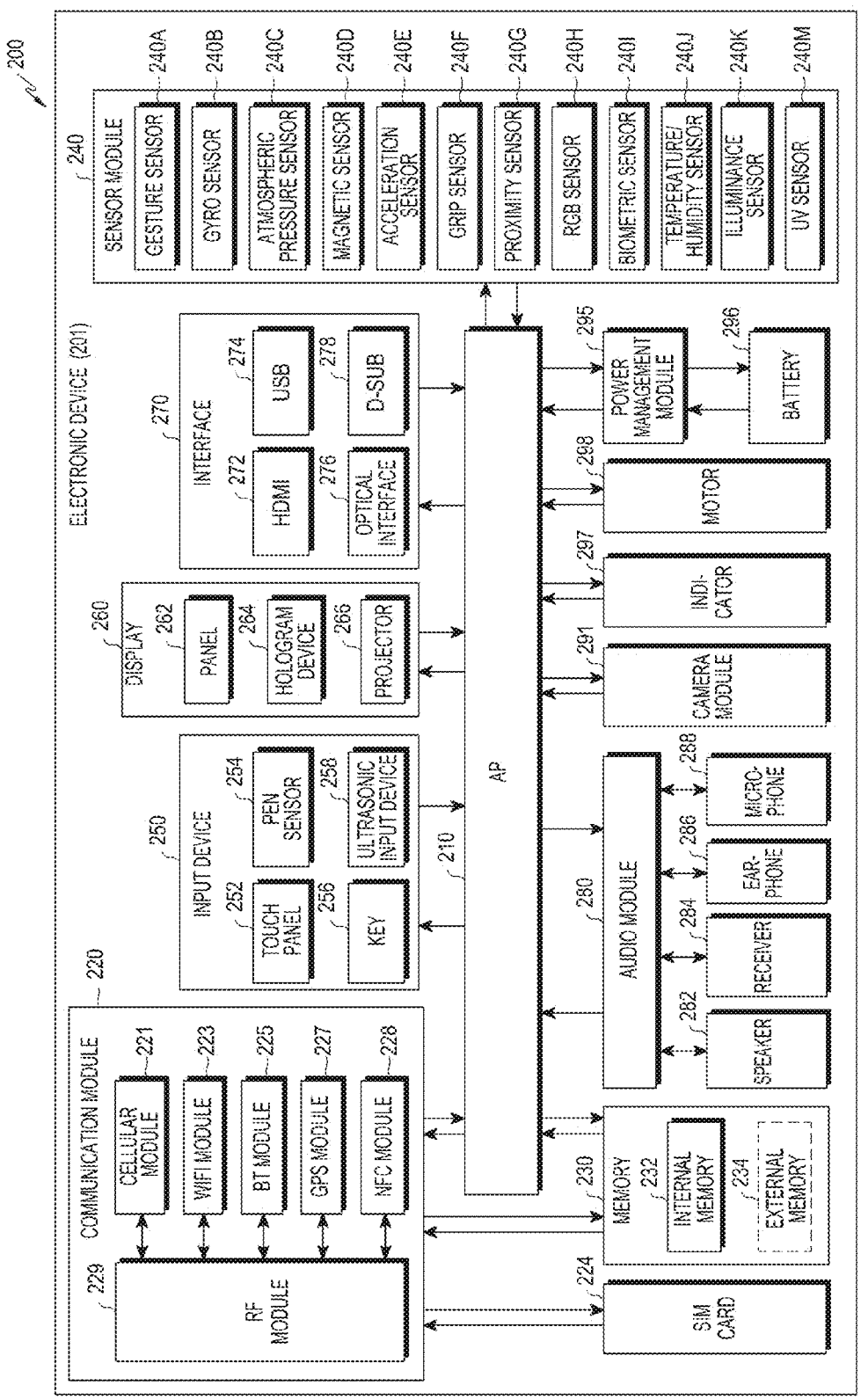
FIG. 2 is a block diagram illustrating an electronic device according to various embodiments.

FIG. 2 is a block diagram 200 illustrating an electronic device 201 according to various embodiments. The electronic device 201 may include, for example, all or some of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected thereto by driving an operating system or an application program 147 and perform a variety of data processing and calculations. The AP 210 may be embodied as, for example, a System on Chip (SoC). According to an embodiment, the AP 210 may further include a Graphical Processing Unit (GPU) and/or an image signal processor. The AP 210 may include at least some of the components (e.g., a cellular module 221) illustrated in FIG. 2. The AP 210 may load instructions or data, received from at least one other component (e.g., a non-volatile memory), in a volatile memory to process the loaded instructions or data, and may store various types of data in a non-volatile memory.

The communication module 220 may have a configuration equal or similar to the communication interface 170 of FIG. 1. The communication module 220 may include, for example, a cellular module 221, a Wi-Fi module 223, a BT module 225, a GPS module 227, a Near Field Communication (NFC) module 228, and a Radio Frequency (RF) module 229.

The cellular module 221 may provide a voice call, video call, text message services, or Internet services through, for example, a communication network (e.g. the network 162 of FIG. 1). According to an embodiment, the cellular module 221 may distinguish between and authenticate electronic devices 201 within a communication network using a subscriber identification module (e.g., the SIM card 224). According to an embodiment, the cellular module 221 may perform at least some of the functions which may be provided by the AP 210. According to an embodiment, the cellular module 221 may include a Communication Processor (CP).

The Wi-Fi module 223, the BT module 225, the GPS module 227, and the NFC module 228 may include, for example, a processor for processing data transmitted/received through the corresponding module. According to some embodiments, at least some (two or more) of the cellular module 221, the Wi-Fi module 223, the BT module 225, the GPS module 227, and the NFC module 228 may be included in one Integrated Chip (IC) or IC package.

The RF module 229 may transmit/receive, for example, a communication signal (e.g., an RF signal). The RF module 229 may include, for example, a transceiver, a Power Amp Module (PAM), a frequency filter, a Low Noise Amplifier (LNA) or an antenna. According to another embodiment, at least one of the cellular module 221, the Wi-Fi module 223, the BT module 225, the GPS module 227, and the NFC module 228 may transmit and receive RF signals through a separate RF module.

The SIM card 224 may include a card including a subscriber identification module and/or an embedded SIM, and contain unique identification information (e.g., an Integrated Circuit Card Identifier (ICCID)) or subscriber information (e.g., an International Mobile Subscriber Identity (IMSI)).

The memory 230 may include, for example, an internal memory 232 and an external memory 234. The internal memory 232 may include at least one of, for example, a volatile memory (e.g., a Dynamic Random Access Memory (DRAM), a Static Random Access Memory (SRAM), a Synchronous Dynamic Random Access Memory (SDRAM), and the like) and a non-volatile memory (e.g., a One Time Programmable Read Only Memory (OTPROM), a Programmable Read Only Memory (PROM), an Erasable and Programmable Read Only Memory (EPROM), an Electrically Erasable and Programmable Read Only Memory (EEPROM), a flash memory (e.g., a NOT-AND (NAND) flash memory or a NOT-OR (NOR) flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a biometric sensor 240I, a temperature/humidity sensor 240J, an illumination sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 240 may further include a control circuit for controlling at least one sensor included therein. In some embodiments, the electronic device 201 may further include a processor configured to control the sensor module 240 as a part of or separately from the AP 210, and may control the sensor module 240 while the AP 210 is in a sleep state.

The input device 250 may include, for example, a touch panel 252, a pen sensor 254, a key 256, or an ultrasonic input device 258. The touch panel 252 may use at least one of, for example, a capacitive type, a resistive type, an infrared type, and an ultrasonic type. The touch panel 252 may further include a control circuit. The touch panel 252 may further include a tactile layer, and provide a tactile reaction to a user.

In some embodiments, the pen sensor 254 may be a digital pen sensor. The pen sensor 254 may include, for example, a recognition sheet which is a part of the touch panel or a separate recognition sheet. The key 256 may include, for example, a physical button, an optical key or a keypad. The ultrasonic input device 258 may detect an ultrasonic wave using a microphone (e.g., the microphone 288) of the electronic device 201 through an input tool generating an ultrasonic signal to identify data.

The display 260 (e.g., the display 160) may include at least one of a panel 262, a hologram device 264 and a projector 266. The panel 262 may be similar to the display 160 of FIG. 1. The panel 262 may be implemented to be, for example, flexible, transparent, or wearable. The panel 262 may also be configured to be integrated with the touch panel 252 as a single module. The hologram device 264 may show a stereoscopic image in the air by using interference of light. The projector 266 may project light onto a screen to display an image. The screen may be located, for example, inside or outside the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some components of the audio module 280 may be included in, for example, the input/output interface 150 illustrated in FIG. 1. The audio module 280 may process sound information input or output through, for example, a speaker 282, a receiver 284, earphones 286, the microphone 288, or the like.

The camera module 291 is a device which may photograph a still image and a dynamic image. According to an embodiment, the camera module 291 may include one or more image sensors (e.g., a front sensor or a back sensor), a lens, an Image Signal Processor (ISP) or a flash (e.g., LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, the remaining amount of battery, a charging voltage, current, or temperature. The battery 296 may include, for example, a rechargeable battery and/or a solar battery.

The indicator 297 may show particular statuses of the electronic device 201 or a part (e.g., AP 210) of the electronic device 201, for example, a booting status, a message status, a charging status and the like. The motor 298 may convert an electrical signal into mechanical vibrations, and may generate a vibration or haptic effect. Although not illustrated, the electronic device 201 may include a processing unit (e.g., GPU) for supporting a mobile TV. The processing device for supporting mobile TV may process media data according to a standard of Digital Multimedia Broadcasting (DMB), Digital Video Broadcasting (DVB), media flow or the like.

Each of the components of the electronic device 201 (or 101, 102, or 104 of FIG. 1) according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 3:
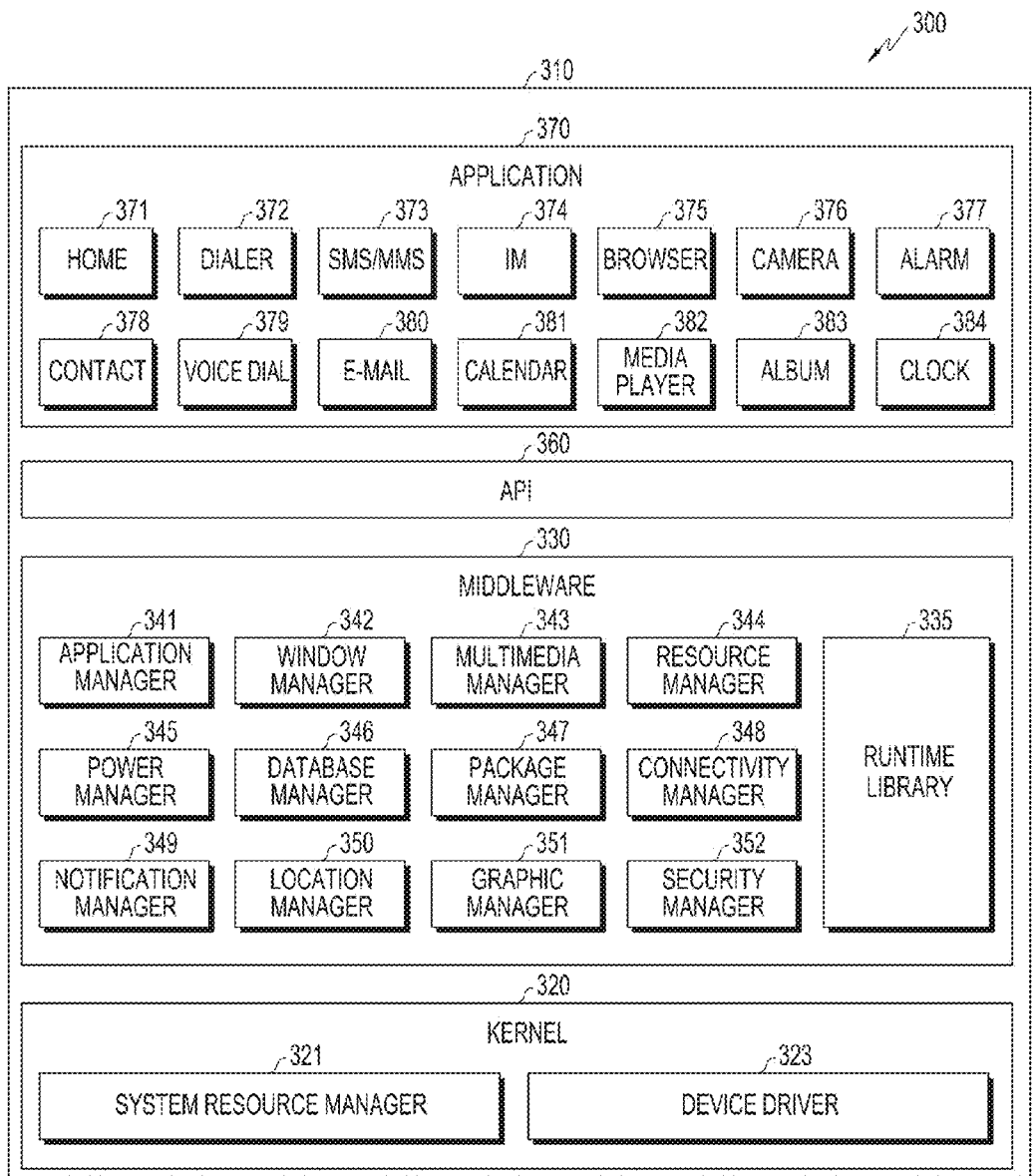
FIG. 3 is a block diagram of a program module according to various embodiments.

FIG. 3 is a block diagram 300 of a program module 310 according to various embodiments. According to an embodiment, the program module 310 (similar to the program 140 of FIG. 1) may include an Operating System (OS) for controlling resources related to the electronic device (e.g., the electronic device 101 of FIG. 1) and/or various applications (similar to the application program 147 of FIG. 1) executed in the operating system. The operating system may be, for example, Android, iOS, Windows, Symbian, Tizen, Bada, or the like.

The program module 310 may include a kernel 320, middleware 330, an Application Programming Interface (API) 360, and/or an application 370. At least some of the program module 310 may be preloaded in the electronic device or downloaded in the server (similar to the server 106).

The kernel 320 (similar to the kernel 141 of FIG. 1) may include, for example, a system resource manager 321 and a device driver 323. The system resource manager 321 may control, allocate, and/or collect the system resources. According to an embodiment, the system resource manager 321 may include a process manager, a memory manager, and/or a file system manager. The device driver 323 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 may efficiently use limited system resources of the electronic device 101. According to an embodiment, the middleware 330 (similar to the middleware 143 of FIG. 1) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

Although not shown, the run time library 335 may include, for example, a library module that a compiler uses in order to add new functions through a programming language while the application 370 is executed. The run time library 335 may perform input/output management, memory management, or a function for an arithmetic function.

The application manager 341 may manage, for example, a life cycle of at least one application among the applications 370. The window manager 342 may manage a Graphical User Interface (GUI) resource used in the screen. The multimedia manager 343 may detect a format required to reproduce various media files, and encode or decode a media file using a codec appropriate for the corresponding format. The resource manager 344 may manage resources such as a source code, a memory and/or a storage space of at least one application among the applications 370.

The power manager 345 may operate together with a Basic Input/Output System (BIOS) to manage a battery or power and may provide power information required for the operation of the electronic device 101. The database manager 346 may generate, search for, or change a database to be used by at least one of the applications 370. The package manager 347 may manage the installation or the update of applications 370 distributed in the form of package file.

For example, the connectivity manager 348 may manage wireless connections, such as Wi-Fi or Bluetooth. The notification manager 349 may display or notify of an event such as a received message, an appointment, a proximity notification, and the like to a user without disturbance. The location manager 350 may manage location information of the electronic device. The graphic manager 351 may manage graphic effects to be provided to a user and user interfaces related to the graphic effects. The security manager 352 may provide various security functions required for system security or user authentication. According to an embodiment, although not shown, when the electronic device 101 has a call function, the middleware 330 may further include a telephony manager to manage a voice call function or a video call function of the electronic device 101.

The middleware 330 may include a middleware module to combine one or more of the aforementioned functions and/or components. The middleware 330 may provide a module specialized for each type of operating system in order to provide a differentiated function. In addition, the middleware 330 may dynamically render some or all of the existing components optional, or add new components.

The API 360 (similar to the API 145 of FIG. 1) may include a set of API programming functions, and a different configuration thereof may be provided according to an operating system. For example, in Android or iOS, one API set may be provided for each platform. In Tizen, two or more API sets may be provided for each platform.

The applications 370 (similar to the application program 147 of FIG. 1) may include, for example, one or more applications 370 that can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (e.g., measure exercise quantity or blood sugar, not shown), or environment information (e.g., atmospheric pressure, humidity, or temperature information, not shown).

According to an embodiment, the applications 370 may include an application (hereinafter, referred to as an "information exchange application") supporting information exchange between the electronic device 101 and external electronic devices (e.g., the electronic devices 102 and 104). The information exchange application may include, for example, a notification relay application to transmit predetermined information to the external electronic device, or a device management application to manage the external electronic device (e.g., the electronic devices 102 and 104).

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device (e.g., the electronic device 102 or 104), and provide the received notification information to a user. For example, the device management application may manage (e.g., install, delete, or update) at least one function of an external electronic device (e.g., the electronic device 104), communicating with the electronic device (e.g., a function of turning on/off the external electronic device (or some components), a function of adjusting luminance (or a resolution) of the display 260, applications operating in the external electronic device (e.g., the electronic device 102 or 104), and services (e.g., a call service and a message service) provided by the external electronic device (e.g., the electronic device 102 or 104).

According to an embodiment, the applications 370 may include an application (e.g., health management application) designated according to attributes (e.g., attributes of the electronic device such as the type of electronic device which corresponds to a mobile medical device) of the external electronic device (e.g., the electronic device 102 or 104). According to an embodiment, the applications 370 may include an application received from the external electronic device (e.g., the server 106, or the electronic device 102 or 104). According to an embodiment, the applications 370 may include a preloaded application or a third party application which can be downloaded from the server 106. Names of the components of the program module 310 according to the above-described embodiments may vary depending on the type of OS.

According to various embodiments of the present disclosure, at least some portions of the program module 310 may be implemented in software, firmware, hardware, or a combination of two or more thereof. At least some portions of the program module 310 may be implemented (e.g., executed) by, for example, the processor (e.g., the AP 210 of FIG. 2). At least some of the program module 310 may include, for example, a module, program, routine, sets of instructions, process, or the like for performing one or more functions.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (e.g., modules or functions thereof) or the method (e.g., operations) according to the present disclosure may be implemented by a command stored in a computer-readable storage medium in a program module form. The instruction, when executed by a processor (e.g., the processor 120 of FIG. 1), may cause the one or more processors to execute the function corresponding to the instruction. The computer-readable storage medium may be, for example, the memory 130 of FIG. 1.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The program module 310 according to the present disclosure may include one or more of the aforementioned components or may further include other additional components, or some of the aforementioned components may be omitted. Operations executed by a module, the program module 310, or other component elements according to various embodiments of the present disclosure may be executed sequentially, in parallel, repeatedly, or in a heuristic manner. Further, some operations may be executed according to another order or may be omitted, or other operations may be added.

According to various embodiments, the computer-readable recording medium 230 (or the memory 130 of FIG. 1) having a program stored therein is provided. The program includes commands configured to allow one or more processors to perform one or more operations when being executed by the one or more processors. The one or more operations includes changing a data collection period according to a power state of an electronic device (e.g., the electronic device 101 of FIG. 1), collecting data according to the changed data collection period, and displaying a current consumption value according to each application type based on the power state of the electronic device based on the collected data.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
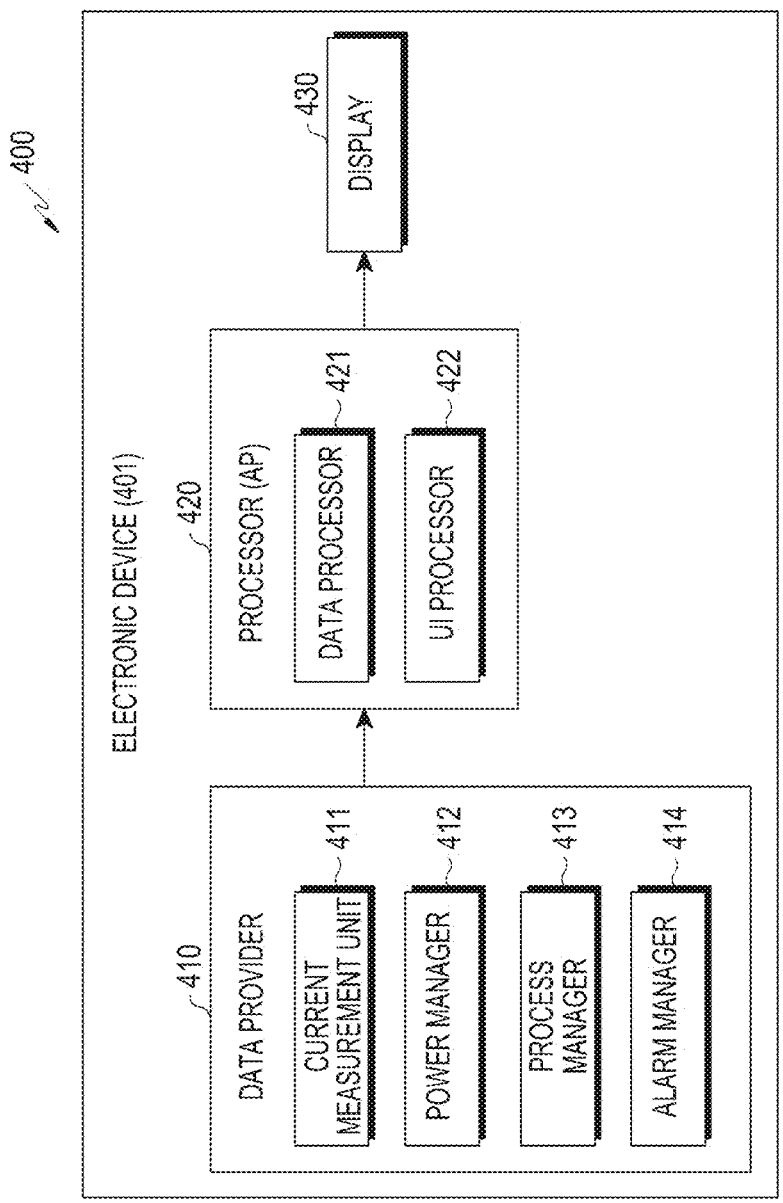
FIG. 4 is a block diagram of an electronic device for controlling power according to various embodiments.

FIG. 4 is a block diagram 400 of an electronic device 401 for controlling power according to various embodiments. Referring to FIG. 4, an electronic device 401 (similar to the electronic device 101, 102, or 104 of FIG. 1 or the electronic device 201 of FIG. 2) may include a data provider 410, a processor 420 (similar to the processor 120 of FIG. 1 or the AP 210 of FIG. 2), and a display 430 (similar to the display 160 of FIG. 1 or the display 260 of FIG. 2).

According to various embodiments, the data provider 410 may provide the processor 420 with data for calculating a current consumption value according to each application type based on a power state of the electronic device 401. The data provider 410 may include a current measurement unit 411, a power manager 412, a process manager 413, and an alarm manager 414. The current measurement unit 411 may be stored in the kernel 320 (of FIG. 3), and the power manager 412, the process manager 413, and the alarm manager 414 may be stored in a framework.

According to various embodiments, the current measurement unit 411 may measure a current amount provided from a battery of the electronic device 401 (e.g., the battery 296 of FIG. 2) as a current consumption value of the electronic device 401 in real time, and store the measured current consumption value of the electronic device 401.

According to an embodiment, although not shown, the current measurement unit 411 may include a current sensor unit driver. The current sensor unit driver may store current information detected through a current sensor included in a Power Management Integrated Circuit (PMIC) (e.g., the power management module 295 of FIG. 2), which can manage power of the electronic device 401, as the current consumption value of the electronic device 401.

According to an embodiment, when an interrupt mode switching command is received from the processor 420 in a sleep state of the electronic device 401, the current measurement unit 411 may switch to an interrupt mode. The current measurement unit 411 may compare the current consumption value of the electronic device 401 and a threshold in the interrupt mode. When the current consumption value of the electronic device 401 is larger than or equal to the threshold based on a result of the comparison, the current measurement unit 411 may transmit a wake up command to the processor 420 and allow the processor 420 to collect data in a sleep state of the electronic device 401.

According to various embodiments, the power manager 412 may identify a power state of the electronic device 401 by controlling the power state of the electronic device 401, and identify and store an execution time according to each application type based on the power state of the electronic device 401.

According to an embodiment, when it is determined that the power state of the electronic device 401 corresponds to at least one of a full wake lock power state, a screen brightness wake lock power state, and a screen dim wake lock power state, the power manager 412 may identify and store the power state of the electronic device 401 as a display power on state. The screen brightness wake lock power state corresponds to a state at a level lower than that of the full wake lock power state. The screen dim wake lock power state corresponds to a state right before a display power off state.

According to an embodiment, when it is determined that the power state of the electronic device 401 corresponds to at least one of a partial wake lock state in which the processor 420 is in an on state, and a sleep state in which the processor 420 is in an off state, the power manager 412 may identify and store the power state of the electronic device 401 as the display power off state.

According to an embodiment, the power manager 412 may identify and store an execution time of an application, which is being executed in the display power off state among the power states of the electronic device 401.

According to various embodiments, the process manager 413 may identify and store an occupancy rate of a memory or a CPU according to each application type.

According to various embodiments, the alarm manager 414 may count the number of times by which an application is woken up in the display power off state according to each application type and store the number of wakeups according to each application type.

According to various embodiments, the processor 420 may collect data in the electronic device 401, calculate a current consumption value according to each application type based on the power state of the electronic device 401 based on the collected data, and provide the user with the calculated current consumption value according to each application type.

According to various embodiments, when the power state of the electronic device 401 corresponds to the display power off state, the processor 420 may calculate a current consumption value according to each application type and provide the calculated current consumption value to the user.

According to various embodiments, the processor 420 may include a data processor 421 and a User Interface (UI) processor 422.

According to various embodiments, the data processor 421 may determine the power state of the electronic device 401 and change a data collection period according to the power state of the electronic device 401. The data processor 421 may collect data for calculating the current consumption value according to each application type based on the power state of the electronic device 401 from the data provider 410 in the unit of the changed data collection period, and process and store the collected data.

According to an embodiment, when it is determined that the power state of the electronic device 401 corresponds to the display power on state, the data processor 421 may change the data collection period into a first data collection period (e.g., 1 second) and collect data from the data provider 410 in the unit of the first data collection period.

According to an embodiment, when it is determined that the power state of the electronic device 401 corresponds to the display power off state, the data processor 421 may change the data collection period into a second data collection period, which is longer than the first data collection period, and collect data from the data provider 410 in the unit of the second data collection period.

According to an embodiment, when it is determined that the power state of the electronic device 401 corresponds to the sleep state, the data processor 421 may transmit a command informing that the power state of the electronic device 401 corresponds to the sleep state to a power controller (not shown) of the processor 420 and may be turned off. When the command informing that the power state of the electronic device 401 corresponds to the sleep state is received from the data processor 421, the power controller may transmit an interrupt mode switching command to the current measurement unit 411 of the data provider 410. When a wakeup command is received from the current measurement unit 411 in the interrupt mode, the power controller may transmit the wakeup command to the data processor 421. When the data processor 421 is woken up according to the wakeup command received from the power controller, the data processor 421 may collect data for calculating the current consumption value according to each application type from the data provider 410.

According to an embodiment, the data collected from the data provider 410 may include at least one of a current consumption value of the electronic device, display on or off state information, an execution time according to each application type executed in the display on or off state, a CPU occupancy rate according to each application type, and the number of times by which an application is woken up in the display off state according to each type of woken up application.

According to an embodiment, when the electronic device 401 is in the display power off state, the data processor 421 may calculate a current consumption value consumed according to each application type by using the current consumption value of the electronic device 401 and the CPU occupancy rate according to each application type in the collected data.

According to an embodiment, when the electronic device 401 is in the display power off state, the data processor 421 may calculate the current consumption value consumed according to each application type through equation (1) below.

Application current consumption value=(application CPU occupancy rate×electronic device current consumption value)    (1)

According to various embodiments, the UI processor 422 may generate the current consumption value according to each application type based on the power state of the electronic device 401 by using the data, which has been collected from the data processor 421 and processed, in a list form and provide the list to the user.

According to an embodiment, the UI processor 422 may display a list including a current consumption rate according to each application type based on the type of power states of the electronic device 401 (e.g., total current consumption, current consumption when in the display power on state, and current consumption in the display power off state) by using the data, which has been collected from the data processor 421 and processed.

According to an embodiment, when the power state of the electronic device 401 corresponds to the display power off state, the UI processor 422 may generate a list including a wakeup rate according to each application type by using the data, which has been collected from the data processor 421 and processed, and provide the list to the user.

According to an embodiment, the UI processor 422 may display at least one control menu for controlling an application selected from the list while displaying the current consumption value according to each application type based on the power state of the electronic device 401 in the list form. At least one control menu may include at least one of a wakeup deactivation menu for configuring the selected application to not be woken up in the display power off state, a list display deactivation menu for configuring the selected application to not be displayed in the list, and a deletion menu for deleting the selected application in the electronic device.

According to various embodiments, the display 430 may provide and display, in the list form, the current consumption value according to each application type based on the power state of the electronic device 401. According to an embodiment, the display 430 may provide and display, in the list form, the current consumption value rate according to each application type in the display power off state. According to an embodiment, the display 430 may provide and display, in the list form, the number of times by which the application is woken up according to each application type in the display power off state.

According to various embodiments, the data processor 410 may be configured to store at least one piece of data for calculating the current consumption value according to each application type, and the processor 420 may be configured to change the data collection period according to the power state of the electronic device, collect the data from the data provider 410, and calculate and display the current consumption value according to each application type based on the power state of the electronic device based on the collected data.

According to various embodiments, the display 430 may be configured to display the current consumption value according to each application type based on the power state of the electronic device.

According to various embodiments, the processor 420 may be configured to collect data according to a first data collection period when the power state of the electronic device corresponds to the display on state, collect data according to a second data collection period when the power state of the electronic device corresponds to the display off state, and switch to an interrupt mode for collecting data when the power state of the electronic device corresponds to the sleep state. The first data collection period may be shorter than the second data collection period.

According to various embodiments, the processor 420 may be configured to collect the data when a wakeup command is received from the current measurement unit 411 that provides the current consumption value of the electronic device in the interrupt mode.

According to various embodiments, the data collected from the data provider 410 may include at least one of a current consumption value of the electronic device, display on or off state information, an execution time according to each application type executed in the display on or off state, a CPU occupancy rate according to each application type, and the number of times by which an application is woken up in the display off state according to each type of woken up application.

According to various embodiments, the processor 420 may be configured to calculate the current consumption value according to each application type through equation (1) above using the current consumption value of the electronic device and the CPU occupancy rate according to each application type in the collected data.

According to various embodiments, the processor 420 may be configured to display one or more menus for controlling the selected application while displaying the list including the current consumption value according to each application type based on the power state of the display.

According to various embodiments, the processor 420 may be configured to not wake up the selected application in the display power off state when a first menu is selected from the one or more menus, to not display the selected application in the list when a second menu is selected from the one or more menus, and to delete the selected application when a third menu is selected from the one or more menus.

According to various embodiments, the data provider 410 may include the current measurement unit 411 that measures and stores the current consumption value consumed in the electronic device, the power manager 412 that stores the display on or off state information and the execution time according to each application type executed in the display on or off state, the process manager 413 that stores the CPU occupancy rate information according to each application type, and the alarm manager 414 that stores the number of times by which the application is woken up according to each type of woken up application in the display off state.

According to various embodiments, the current measurement unit 411 may be configured to switch to the interrupt mode when the power state of the electronic device corresponds to the sleep state, and to transmit the wakeup command to the processor when the current consumption value measured in the interrupt mode is larger than or equal to a threshold value.

Figures 5C, 6A:
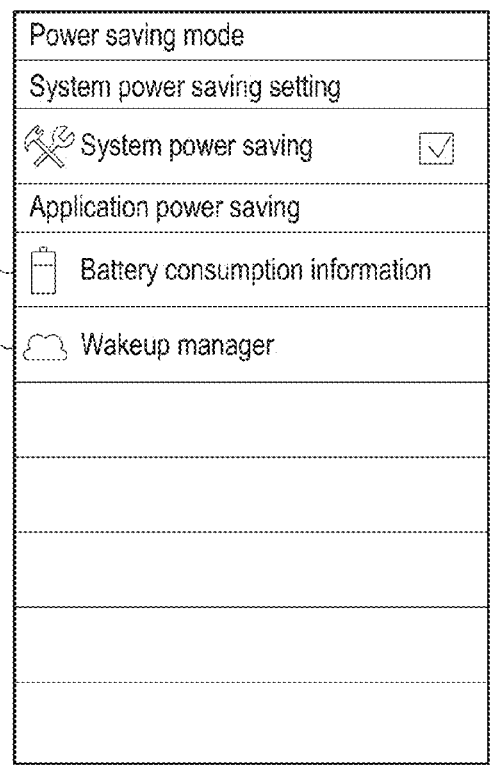

FIGS. 5A through 5C illustrate data collected by the electronic device according to various embodiments. FIGS. 5A through 5C describe an operation of the data processor 421 of the processor 420 of FIG. 4. In FIG. 5A, a data collection period according to the power state of the electronic device 401 is illustrated. Referring to FIG. 5A, when the power state of the electronic device corresponds to at least one of a full wake lock power state, a screen bright wake lock power state, and a screen dim wake lock power state, the data collection period may be set as a first data collection period. When the power state of the electronic device corresponds to a partial wake lock power state, the data collection period may be set as a second data collection period longer than the first data collection period. When the power state of the electronic device corresponds to a sleep state, the data collection period may switch to an interrupt mode.

In FIG. 5B, data collected from the data provider 410 is illustrated. As illustrated in FIG. 5B, the collected data may be accumulated as an application type (a1), an execution time (b1), a CPU occupancy rate (c1), a current consumption value (d1), the number of times (e1) by which the application is woken up in the display power off state, and display state information (f1) and managed by a database. Further, as illustrated in FIG. 5B, one application (e.g., App-1) may be separately managed according to the power state of the display (e.g., the display power on or off state), and may be provided to the user while being distinguished according to the power state of the display.

FIG. 5C illustrates data including a calculated current consumption value actually consumed by an application. As illustrated in FIG. 5B, the current consumption value (d1) in the data collected from the data provider 410 indicates a current consumption value consumed by the electronic device 401, so that the current consumption value actually consumed by the application may be calculated using the CPU occupancy rate in the collected data. As illustrated in FIG. 5C, a current consumption value (d2) consumed according to each application type may be calculated through equation (1) above in the display power on or off state and managed by a database.

Figure 6B:
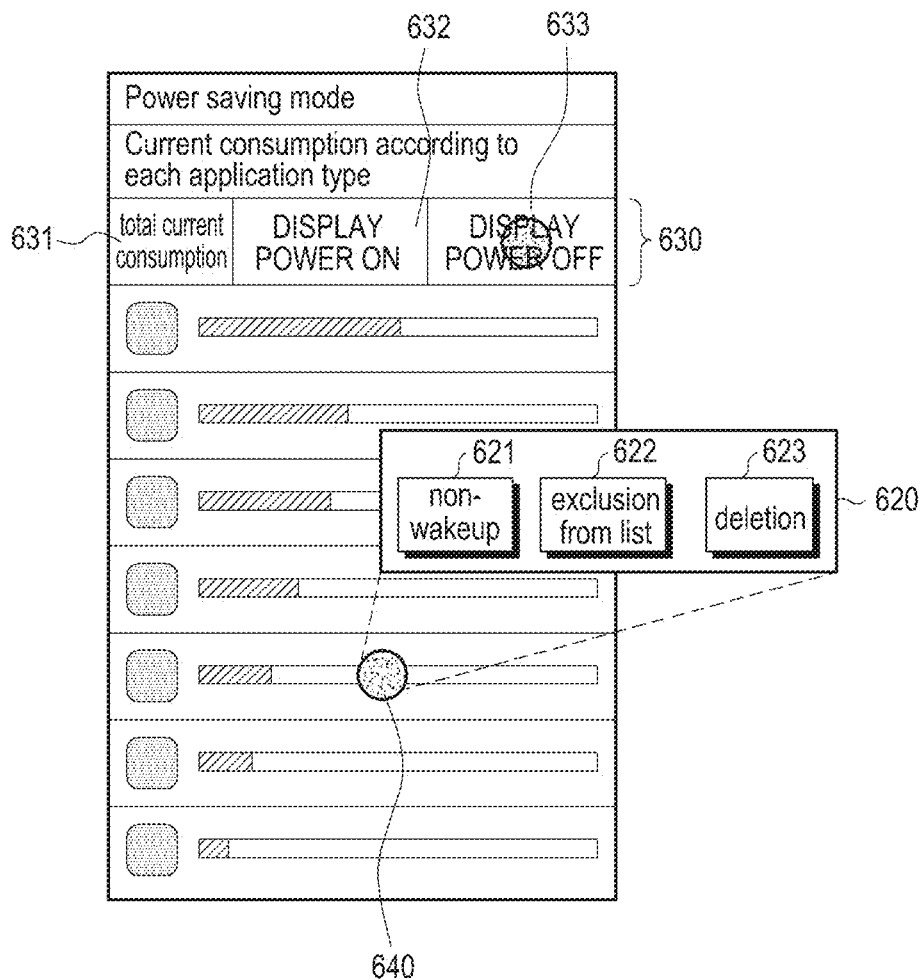
Figure 6C:
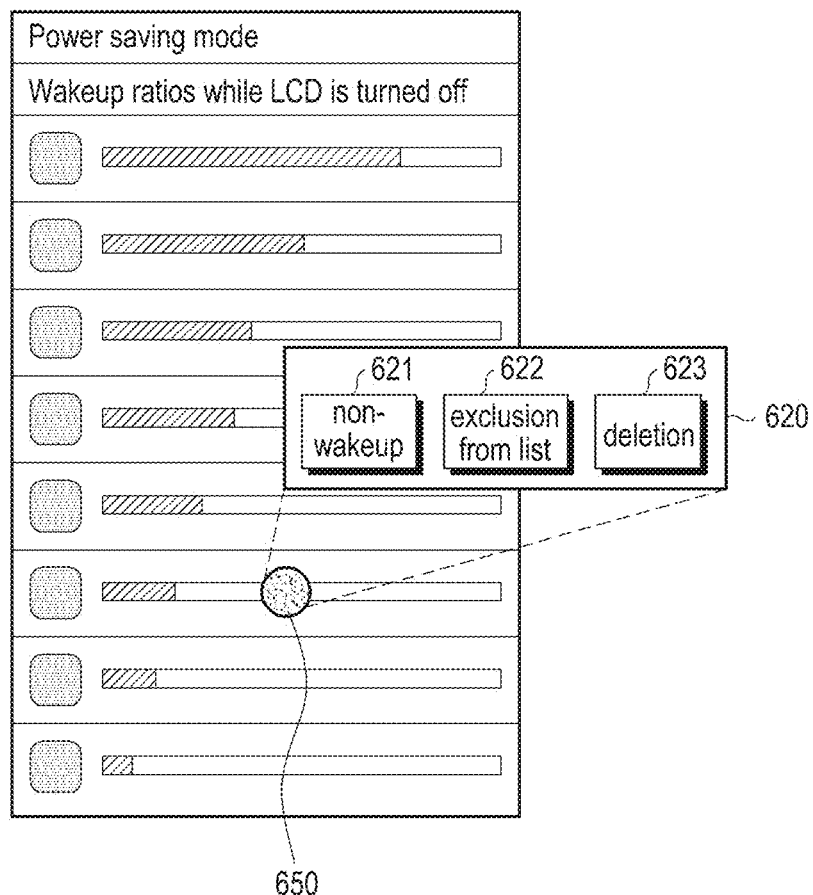

FIGS. 6A through 6C illustrate a list including a current consumption value according to each application type in the electronic device according to various embodiments. FIGS. 6A through 6C describe an operation of the UI processor 421 of the processor 420 of FIG. 4. As illustrated in FIG. 6A, when an application saving mode of the power saving mode is selected in the electronic device 401, the electronic device 401 may display a battery consumption information menu 601 and a wakeup manager menu 602.

When the battery consumption information menu 601 is selected in FIG. 6A, the electronic device 401 may display three menus 630 to show a ratio of the current consumption value according to each application type based on the power state of the electronic device 401 as illustrated in FIG. 6B based on the data of FIG. 5C (e.g., the application type (a1), the execution time (b1), the current consumption value (d2), and the display state information (f1)). In the embodiment, when a total current consumption menu 631 is selected from the three menus, the electronic device 401 may display a list including application types sequentially in a descending order of current consumption and ratios of the corresponding current consumption values regardless of the power state of the electronic device. When a display power on menu 632 is selected from the three menus, the electronic device 401 may display a list including application types sequentially in a descending order of current consumption in the display power on state and ratios of the corresponding current consumption values. When a display power off menu 633 is selected from the three menus, the electronic device 401 may display a list including application types sequentially in a descending order of current consumption in the display power off state and ratios of the corresponding current consumption values as illustrated in FIG. 6C.

When an item 640 including the application type and the ratio of the corresponding current consumption value are selected in the list, the electronic device 401 may display a control menu 620 for controlling an application corresponding to the selected item 640.

When a "non-wakeup" menu 621 is selected from the control menu 620, the electronic device may configure an internal interrupt of the application of the selected item not to be generated in a display power off state. With respect to the application selected through the "non-wakeup" menu 621, the internal interrupt is not generated in the display power off state and thus the wakeup may be deactivated, and the internal interrupt is generated in the display power on state and thus the wakeup may be activated. When an "exclusion from list" menu 622 is selected from the control menu 620, the electronic device may configure list display deactivation so that the application of the selected item 640 is not displayed in the list. The "exclusion from list" menu 622 may prevent applications having frequent wakeups in the display power off state from being always displayed on the top of the list in proportion to the number of time by which the applications are executed by the user. When a "deletion" menu 623 is selected from the control menu 620, the electronic device 401 may delete the application of the selected item 640.

When the wakeup manager menu 602 is selected in FIG. 6A, the electronic device 401 may display woken up application types in the display power off state in a list form as illustrated in FIG. 6C based on the data of FIG. 5C (e.g., the application type (a1), the execution time (b1), the number of wakeups (e1), and the display state information (f1)). The wakeup manager menu 602 may display application types, which are frequently woken up in the display power off (LCD off) state, in a descending order through the list. The list may display an absolute value of the number of wakeups or a relative ratio. For example, when a total of 50 wakeups are generated in the display power off state (LCD off) and 15 wakeups of a first application (App-1) are generated, a wakeup ratio of the first application (App-1) may be displayed by 30%. Further, in order to display an application, which is not frequently used but has a large current consumption value, the electronic device 401 may display a list including the number of times by which the application is actually executed and a ratio of the number of times by which the application is woken up in the display power off state.

The processor 420 may be woken up by an interrupt in the sleep state of the electronic device 401. The interrupt type may be divided into an internal interrupt (software (S/W) interrupt) and an external interrupt (hardware (H/W) interrupt). The internal interrupt may correspond to a timer/counter (not shown) generated by a request from S/W executed inside the processor 420, and the external interrupt may correspond to an input of a CP, a sensor, a PMIC, or a button. In the wakeup manager menu 602, a wakeup ratio according to each application type based on the number of wakeups generated by the internal interrupt is displayed in the list form. In a case of the OS of the electronic device 401, a predetermined time or period may be registered in an alarm manager (e.g., the alarm manager 414) to perform a sync operation or an alarm or timer operation according to each application type. Then, the processor 420 may be woken up regardless of the sleep state of the electronic device 401 according to registered information and perform operations according to the wakeup. Further, when the number of applications of which alarms or timers are registered in the alarm manager (e.g., the alarm manager 414) becomes larger, the time for which the electronic device 401 switches to the sleep state is relatively reduced and exerts a bad effect on a standby current, which results in reduction in a battery use time. Accordingly, if the electronic device 401 counts the number of times by which applications are woken up according to each application type in the sleep state of the electronic device 401 and shows the counted number through the wakeup manager menu 602, the electronic device may guide the user to more actively manage the applications.

When an item 650 including the application type and the wakeup ratio is selected from the list displayed through the selection of the wakeup manager menu 602, the electronic device may display the menu 620 identical to that of FIG. 6B through which the application corresponding to the selected item can be controlled.

Figure 7:
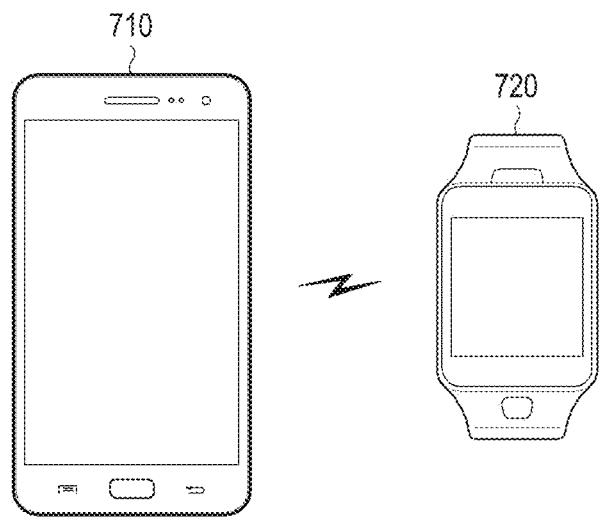
FIG. 7 illustrates a power control operation of a second electronic device connected to a first electronic device according to various embodiments.

FIG. 7 illustrates a power control operation of a second electronic device (e.g., the electronic device 102 of FIG. 1) connected to a first electronic device (e.g., the electronic device 101 of FIG. 1) according to various embodiments. In FIG. 7, a first electronic device 710 may include the electronic device 401 of FIG. 4, and a second electronic device 720 may include at least one of the data provider 410, the processor 420, and the display module 430 of the electronic device 401 of FIG. 4. The second electronic device 720 may include a wearable device (e.g., a smart watch).

The second electronic device 720 may be connected to the first electronic device 710 through communication. Similar to the first electronic device 710, the second electronic device 720 may change a data collection period according to a power state of the second electronic device 720, collect data from the data provider 410, calculate a current consumption value according to each application type based on the power state of the second electronic device 720 based on the collected data, and display the calculated current consumption value through the display. The second electronic device 720 may display the current consumption value according to each application type based on the power state of the second electronic device 720 in a list form as illustrated in FIG. 6B or 6C. When an item including the application type is selected from the list as illustrated in FIG. 6B or 6C, the second electronic device 720 may display the control menu 620 (of FIG. 6B) through which the application corresponding to the selected item can be controlled.

The second electronic device 720 may configure power control information (e.g., "non-wakeup", "exclusion from list", or "deletion" of FIG. 6B) on the application corresponding to the selected item through the control menu 620, and transmit the power control information on the application to the first electronic device 710 to share the power control information on the application of the second electronic device 720 with the first electronic device 710.

The first electronic device 710 may store the power control information on the application of the second electronic device 720 received from the second electronic device 720. The first electronic device 710 may determine whether to transmit a related notification according to each application type to the second electronic device 720 according to the power control information on the application of the second electronic device 720.

For example, when a call application, a message application, a Kakao Talk application, and an email application are included in the list illustrated in FIG. 6B or 6C, the second electronic device 720 may configure "non-wakeup" for the email application as the power control information on the application through the control menu 620, and transmit the power control information on the application (e.g., "non-wakeup" for the email application) to the first electronic device 710. The first electronic device 710 may store the power control information on the application of the second electronic device 720 (e.g., non-wakeup" for the email application) received from the second electronic device 720. According to the power control information on the application (e.g., non-wakeup" for the email application), the first electronic device 710 may not transmit a notification related to the email application to the second electronic device 720 when the second electronic device 720 is in the display power off state.

Figure 8:
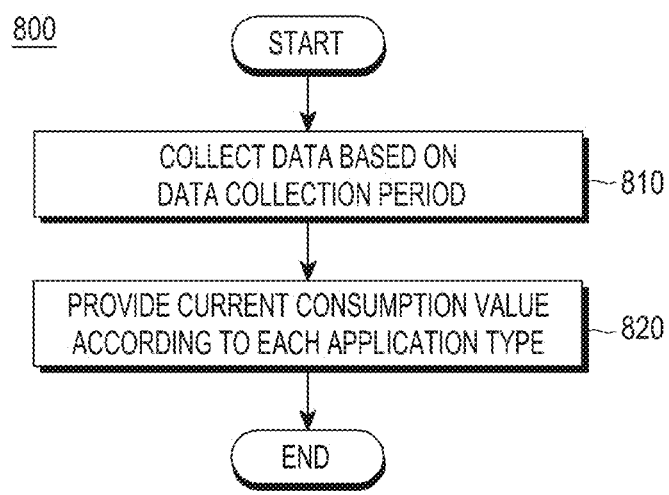
FIG. 8 is a flowchart illustrating a method of calculating and displaying a current consumption value according to each application type by an electronic device according to various embodiments.

FIG. 8 is a flowchart illustrating a method 800 of calculating and displaying a current consumption value according to each application type by the electronic device 401 according to various embodiments. In FIG. 8, a method 800 of calculating and displaying a current consumption value according to each application type according to various embodiments may be performed by, for example, the processor 420 of the electronic device 401 of FIG. 4. Referring to FIG. 8, in operation 810, the processor 420 may identify a power state of the electronic device 401 and identify a data collection period corresponding to the power state of the electronic device 401. In operation 810, the processor 420 may collect data, through which the current consumption value according to each application type can be calculated, from the data provider 410 based on the identified data collection period. The collected data may include at least one of a current consumption value of the electronic device 401, display on or off state information, an execution time according to each application type executed in the display on or off state, a CPU occupancy rate according to each application type, and the number of times by which an application is woken up in the display off state according to each type of woken up application. Operation 810 may be described in detail with reference to FIGS. 9 and 10.

In operation 820, the processor 420 may calculate the current consumption value according to each application type based on the power state based on the collected data. In operation 820, the processor 420 may provide the calculated current consumption value according to each application type based on the power state. Operation 820 may be described in detail with reference to FIGS. 11A and 11B.

Figure 9:
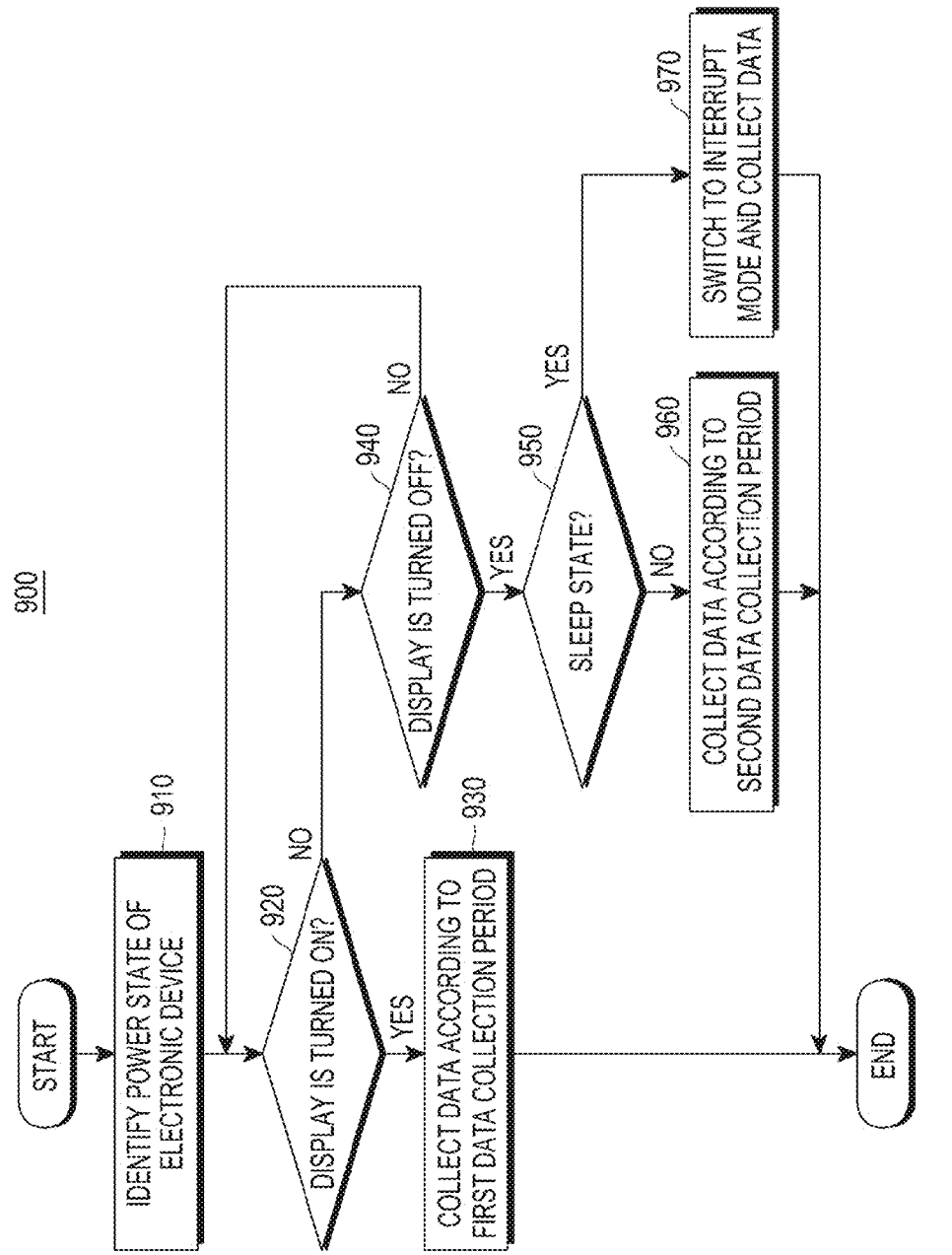
FIG. 9 is a flowchart illustrating a method of collecting data by an electronic device according to various embodiments.

FIG. 9 is a flowchart illustrating a method of collecting data by the electronic device 401 according to various embodiments. In FIG. 9, a method 900 of collecting data according to various embodiments may be performed by, for example, the processor 420 of the electronic device 401 of FIG. 4. Referring to FIG. 9, in operation 910, the processor 420 may identify a power state of the electronic device 401. When it is identified that the power state of the electronic device 401 corresponds to the display power on state in operation 920, the processor 420 may change the data collection period into a first data collection period in operation 930. In operation 920, the processor 420 may collect data, through which the current consumption value according to each application type can be calculated, from the data provider 410 in the display power on state of the electronic device 401 based on the first data collection period.

When it is identified that the power state of the electronic device 401 corresponds to the display power off state in operation 940, the processor 420 may identify whether the power state of the electronic device corresponds to the sleep state in operation 950. When it is determined that the power state of the electronic device 401 is not the sleep state (e.g., partial wake lock power state) in operation 950, the processor 420 may change the data collection period into a second data collection period longer than the first data collection period. In operation 960, the processor 420 may collect data, through which the current consumption value according to each application type can be calculated, from the data provider 410 in the display power off state of the electronic device 401 based on the second data collection period. When it is determined that the power state of the electronic device corresponds to the sleep state in operation 950, the processor 420 may switch to an interrupt mode in operation 970. The processor 420 may collect data only when the interrupt is generated in the interrupt mode in operation 970. An operation for collecting the data in the interrupt mode may be described in detail through FIG. 10.

Figure 10:
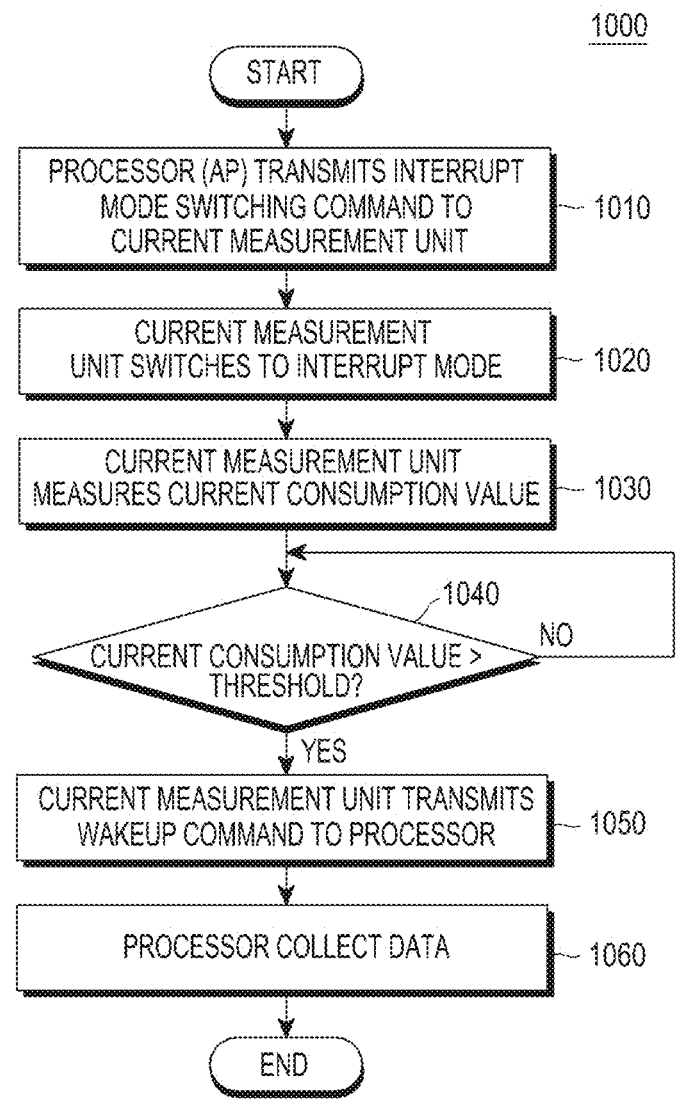
FIG. 10 is a flowchart illustrating a method of collecting data in an interrupt mode by an electronic device according to various embodiments.

FIG. 10 is a flowchart illustrating a method of collecting data in the interrupt mode by the electronic device 401 according to various embodiments. In FIG. 10, a method 1000 of collecting data in the interrupt mode according to various embodiments may be performed by, for example, the processor 420 of the electronic device 401 of FIG. 4. Referring to FIG. 10, when it is determined that the power state of the electronic device 401 corresponds to the sleep state, the processor 420 may transmit an interrupt mode switching command to the current measurement unit 411 and may be turned off in operation 1010. When the interrupt mode switching command is received from the processor 420, the current measurement unit 411 may switch to the interrupt mode in operation 1020.

The current measurement unit 411 may measure a present current consumption value of the electronic device 401 in operation 1030, and compare the measured current consumption value of the electronic device with a threshold value in operation 1040. When it is determined that the measured current consumption value of the electronic device is larger than or equal to the threshold value in operation 1040, the current measurement unit 411 may transmit a wakeup command to the processor in operation 1050. Alternatively, when it is determined that the current consumption value of the electronic device measured for a predetermined time or longer is larger than or equal to the threshold value in operation 1040, the current measurement unit 411 may transmit a wakeup command to the processor 420 in the operation 1050.

When the wakeup command is received from the current measurement unit 411, the processor 420 may be turned on and may collect data, through which the current consumption value according to each application type can be calculated, from the data provider 410 in the sleep state of the electronic device 401, that is, the display power off state in operation 1060. The processor 420 may return back to the off state after the data collection.

Figure 11A:
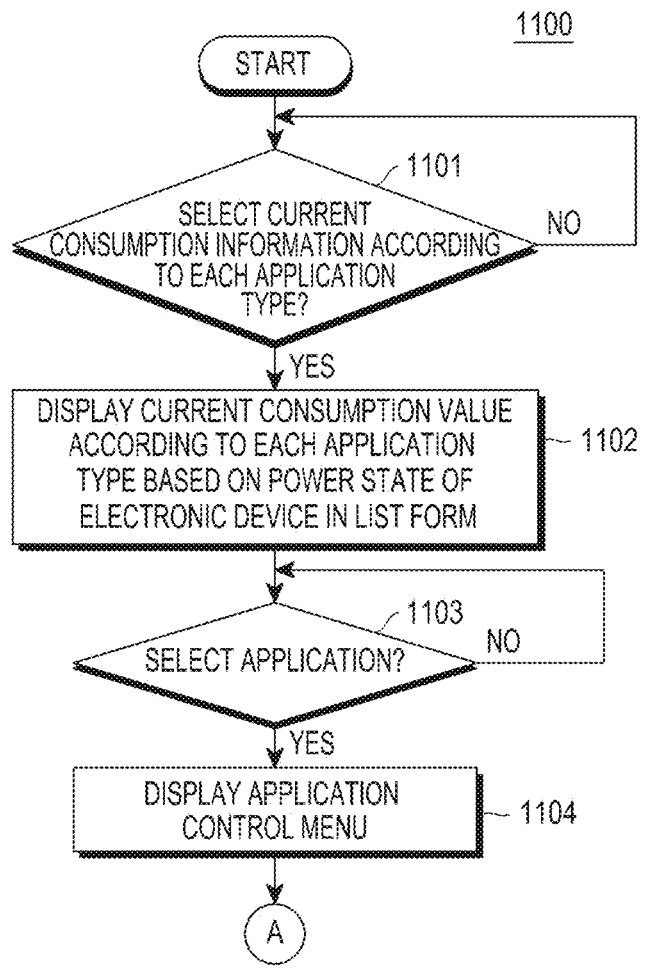
FIGS. 11A and 11B are flowcharts illustrating a method of displaying a list including a current consumption value according to each application type by an electronic device according to various embodiments.
Figure 11B:
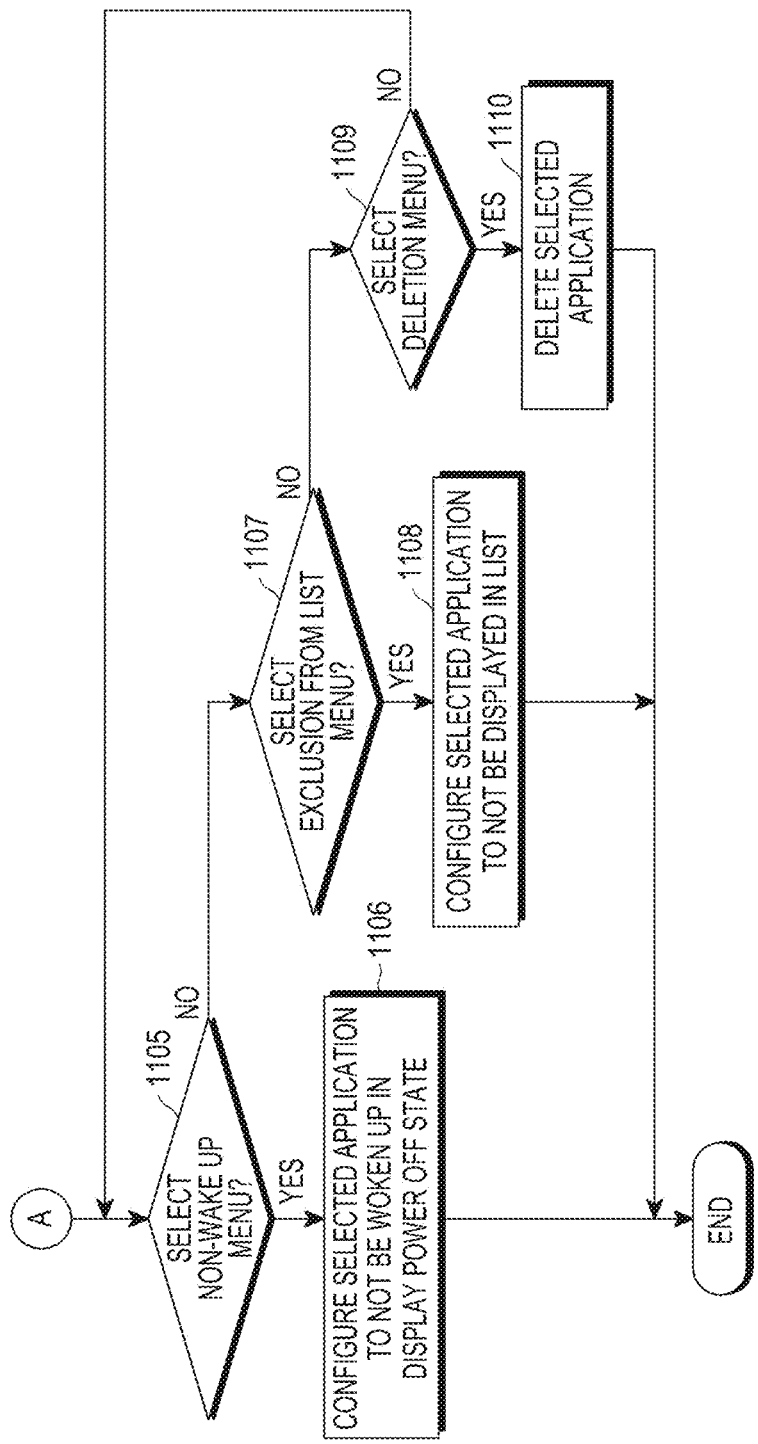

FIGS. 11A and 11B are flowcharts illustrating a method of displaying a list including a current consumption value according to each application type by the electronic device according to various embodiments. In FIGS. 11A and 11B, a method 1100 of displaying a list according to various embodiments may be performed by, for example, the processor 420 of the electronic device 401 of FIG. 4. Referring to FIGS. 11A and 11B, in operation 1101, the processor 420 may determine to select displaying of current consumption information according to each application type. When the displaying of the current consumption information according to each application type is selected in operation 1101, the processor 420 may display the current consumption value according to each application type based on a power state of the electronic device in a list form based on data collected from the data provider 410 in operation 1102. When it is determined to select an application from one or more applications displayed in the list in operation 1103, the processor 420 may display one or more control menus (e.g. the control menu 620) through which the selected application can be controlled in operation 1104. When a wakeup deactivation menu is selected from the one or more control menus (e.g. the control menu 620) in operation 1105, the processor 420 may configure the selected application to be not woken up by preventing an interrupt from being generated in the display power off state in operation 11060. When a list display deactivation menu is selected from the one or more control menus (e.g. the control menu 620) in operation 1107, the processor 420 may configure the selected application to be not displayed in the list in operation 1108. When a deletion menu is selected from the one or more control menus (e.g. the control menu 620) in operation 1109, the processor 420 may delete the selected application from the electronic device 401 in operation 1110.

According to various embodiments, a method of controlling power of an electronic device may include changing a data collection period according to a power state of an electronic device, collecting data according to the changed data collection period, and calculating and displaying a current consumption value according to each application type based on the power state of the electronic device based on the collected data.

According to various embodiments, the changing of the data collection period may include collecting data according to a first data collection period when the power state of the electronic device corresponds to a display on state, collecting data according to a second data collection period when the power state of the electronic device corresponds to a display off state, and switching to an interrupt mode, in which data is collected when an interrupt is generated, when the power state of the electronic device corresponds to a sleep state, and the first data collection period may be shorter than the second data collection period.

According to various embodiments, the switching to the interrupt mode may include collecting the data by a processor when a wakeup command is received from a current measurement unit 411 that provides the current consumption value of the electronic device in the interrupt mode.

According to various embodiments, the collecting of the data may include transmitting the wakeup command to the processor by the current measurement unit 411 when the measured current consumption value is larger than or equal to a threshold value.

According to various embodiments, the collected data may include at least one of a current consumption value of the electronic device, display on or off state information, an execution time according to each application type executed in the display on or off state, a CPU occupancy rate according to each application type, and the number of times by which an application is woken up in the display off state according to each type of woken up application.

According to various embodiments, the calculating of the current consumption value may include calculating the current consumption value according to each application type through equation (1) of application current consumption value=(application CPU occupancy rate×electronic device current consumption value) using the current consumption value and a CPU occupancy rate according to each application type in the collected data.

According to various embodiments, the displaying of the current consumption value according to each application type may include displaying a list including the current consumption value according to each application type based on a power state of a display, and when an application is selected from the list, displaying one or more menus for controlling the selected application.

According to various embodiments, the method may further include: when a first menu is selected from the one or more menus, configuring the selected application to be not woken up in a display power off state, when a second menu is selected from the one or more menus, configuring the selected application to be not displayed in the list, and when a third menu is selected from the one or more menus, deleting the selected application.

What is claimed is:

1. An electronic device comprising:
    a data provider configured to store at least one piece of data for calculating a current consumption value according to each application type; and
    a processor configured to change a data collection period according to a power state of a display of the electronic device, collect data from the data provider, and calculate and display the current consumption value according to each application type based on the power state of the electronic device based on the collected data.

2. The electronic device of claim 1, wherein the display displays the current consumption value according to each application type based on the power state of the electronic device.

3. The electronic device of claim 1, wherein the processor collects data according to a first data collection period when the power state of the electronic device corresponds to a display on state, collects data according to a second data collection period when the power state of the electronic device corresponds to a display off state, and switches to an interrupt mode, in which data is collected when an interrupt is generated, when the power state of the electronic device corresponds to a sleep state, and the first data collection period is shorter than the second data collection period.

4. The electronic device of claim 3, wherein the processor collects the data when a wakeup command is received from a current measurement unit that provides a current consumption value of the electronic device in the interrupt mode.

5. The electronic device of claim 1, wherein the data collected from the data provider includes at least one of a current consumption value of the electronic device, display on or off state information, an execution time according to an application type executed in the display on or off state, a CPU occupancy rate according to each application type, and a number of times by which an application is woken up in the display off state according to each type of woken up application.

6. The electronic device of claim 1, wherein the processor calculates the current consumption value according to each application type through equation (1) of application current consumption value=(application CPU occupancy rate×electronic device current consumption value) using the current consumption value and a CPU occupancy rate according to each application type in the data collected from the data provider.

7. The electronic device of claim 1, wherein the processor display one or more menus to control a selected application while displaying a list including the current consumption value according to each application type based on the power state of the display.

8. The electronic device of claim 7, wherein the processor configures the selected application to not be woken up in a display power off state when a first menu is selected from the one or more menus, configures the selected application to not be displayed in the list when a second menu is selected from the one or more menus, and deletes the selected application when a third menu is selected from the one or more menus.

9. The electronic device of claim 1, wherein the data provider comprises:
    a current measurement unit that measures and stores a current consumption value consumed in the electronic device;
    a power manager that stores display on or off state information and an execution time according to each application type executed in the display on or off state;
    a process manager that stores CPU occupancy rate information according to each application type; and
    an alarm manager that stores a number of times by which an application is woken up in the display off state according to each type of woken up application.

10. The electronic device of claim 9, wherein the current measurement unit switches to an interrupt mode when the power state of the electronic device corresponds to a sleep state, and transmits a wakeup command to the processor when a current consumption value measured in the interrupt mode is larger than or equal to a threshold value.

11. A method of controlling power of an electronic device, the method comprising:
    changing a data collection period according to a power state of a display of the electronic device;
    collecting data according to the changed data collection period; and
    calculating and displaying a current consumption value according to each application type based on the power state of the electronic device based on the collected data.

12. The method of claim 11, wherein the changing of the data collection period comprises:
    collecting data according to a first data collection period when the power state of the display of the electronic device corresponds to a display on state;
    collecting data according to a second data collection period when the power state of the electronic device corresponds to a display off state; and switching to an interrupt mode, in which data is collected when an interrupt is generated, when the power state of the electronic device corresponds to a sleep state, and the first data collection period is shorter than the second data collection period.

13. The method of claim 12 wherein the switching to the interrupt mode comprises collecting the data by a processor when a wakeup command is received from a current measurement unit that provides the current consumption value of the electronic device in the interrupt mode.

14. The method of claim 13, wherein the collecting of the data comprises transmitting the wakeup command to the processor by the current measurement unit when a measured current consumption value is larger than or equal to a threshold value.

15. The method of claim 11, wherein the collected data includes at least one of a current consumption value of the electronic device, display on or off state information, an execution time according to an application type executed in the display on or off state, a CPU occupancy rate according to each application type, and a number of times by which an application is woken up in the display off state according to each type of woken up application.

16. The method of claim 11, wherein the calculating of the current consumption value comprises calculating the current consumption value according to each application type through equation (1) of application current consumption value=(application CPU occupancy rate×electronic device current consumption value) using the current consumption value and a CPU occupancy rate according to each application type in the collected data.

17. The method of claim 11, wherein the displaying of the current consumption value according to each application type comprises:
 displaying a list including the current consumption value according to each application type based on a power state of a display; and
 when an application is selected from the list, displaying one or more menus for controlling the selected application.

18. The method of claim 17, further comprising:
 when a first menu is selected from the one or more menus, configuring the selected application to be not woken up in a display power off state;
 when a second menu is selected from the one or more menus, configuring the selected application to be not displayed in the list; and
 when a third menu is selected from the one or more menus, deleting the selected application.

\* \* \* \* \*